United States Patent
Le Mer et al.

(10) Patent No.: US 7,267,083 B2
(45) Date of Patent: Sep. 11, 2007

(54) CONDENSING HEAT EXCHANGER WITH DOUBLE BUNDLE OF TUBES

(75) Inventors: Joseph Le Mer, Ty Nod, F-29600 Morlaix (FR); Rocco Giannoni, Milan (IT)

(73) Assignee: Joseph Le Mer, Morlaix (FR)

( * ) Notice: Subject to any disclaimer, the term of this patent is extended or adjusted under 35 U.S.C. 154(b) by 0 days.

(21) Appl. No.: 10/523,576

(22) PCT Filed: Jun. 6, 2003

(86) PCT No.: PCT/FR03/01698

§ 371 (c)(1),
(2), (4) Date: Oct. 28, 2005

(87) PCT Pub. No.: WO2004/016995

PCT Pub. Date: Feb. 26, 2004

(65) Prior Publication Data

US 2006/0102106 A1    May 18, 2006

(30) Foreign Application Priority Data

Jul. 30, 2002    (FR) .................................. 02 09647

(51) Int. Cl.
*F22B 37/12*    (2006.01)
(52) U.S. Cl. .................. 122/32; 122/18.1; 122/248
(58) Field of Classification Search .................. 122/32, 122/33, 31.1, 15.1, 18.1
See application file for complete search history.

(56) References Cited

U.S. PATENT DOCUMENTS

| 4,357,910 | A | * | 11/1982 | Blockley et al. ............ 122/248 |
| 4,393,815 | A | * | 7/1983 | Pedersen et al. ........... 122/31.1 |
| 4,621,681 | A | * | 11/1986 | Grover ........................ 165/47 |
| 5,307,802 | A | * | 5/1994 | Placek ........................ 126/600 |
| 5,687,678 | A | | 11/1997 | Suchomel et al. |

FOREIGN PATENT DOCUMENTS

| EP | 0 078 207 A2 | 5/1983 |
| WO | WO94/16272 | 7/1994 |

* cited by examiner

*Primary Examiner*—Gregory Wilson
(74) *Attorney, Agent, or Firm*—Blakely Sokoloff Taylor & Zafman

(57) ABSTRACT

The invention relates to a heat exchanger comprising a pair of tube bundles (21, 31) through which the fluid to be heated flows, one primary bundle (21) surrounding a cylindrical burner (40) and the other secondary bundle (31) on which the water steam contained in the combustion gas exhausting from the primary bundle is condensed, whereby the tubes forming the bundles have a flattened section and a helicoidal shape, such that the combustion gas flow between the coils, from the inside to the outside for the primary bundle (21) and in the reverse order for the secondary bundle (31), both bundles being arranged inside a same shell (1). Said heat exchanger is characterised in that the axial dimension ($l_2$) of the secondary bundle is substantially smaller than the axial dimension ($l_1$) of the primary bundle, such that an available space for an exhaust trunking (7) is provided at the end of said secondary bundle (31). The present invention also relates to a gas- or oil-fired boiler, especially for domestic application, with high efficiency, space saving and reduced weight.

15 Claims, 7 Drawing Sheets

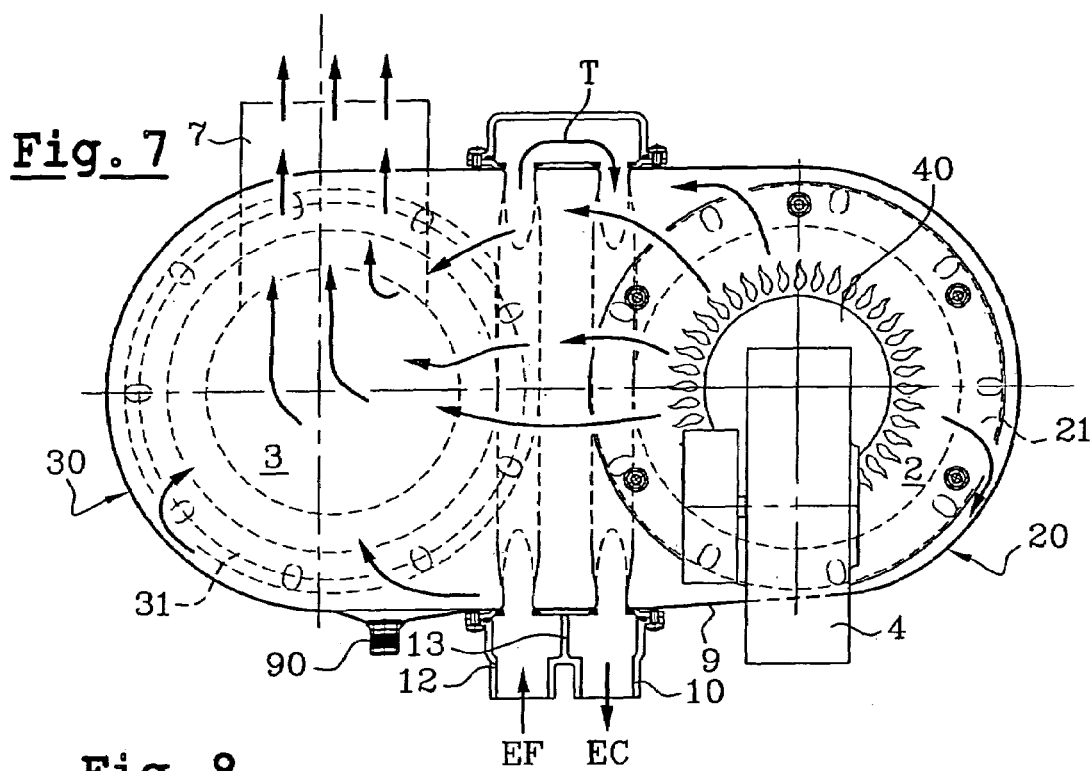
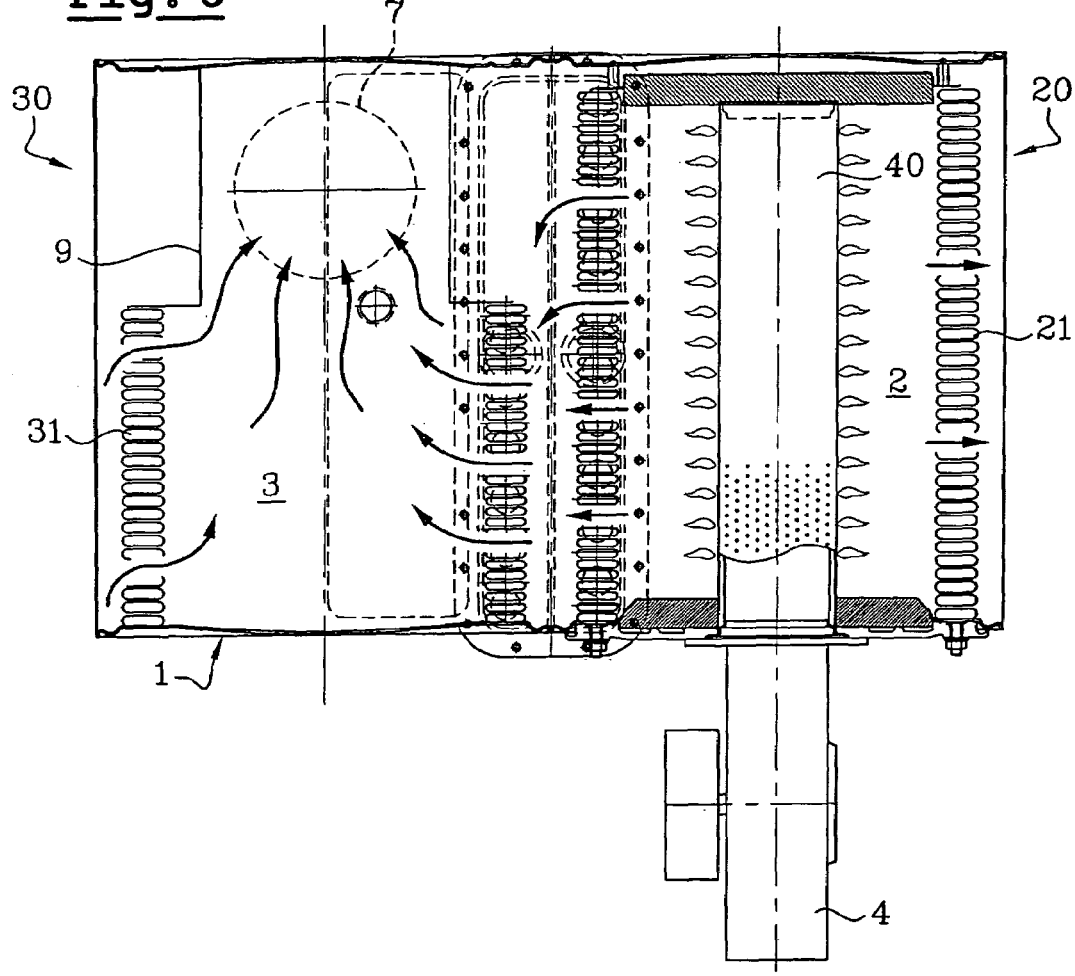

CONDENSING HEAT EXCHANGER WITH DOUBLE BUNDLE OF TUBES

BACKGROUND OF THE INVENTION

1. Field of the Invention

The invention relates to a condensation heat exchanger intended to equip a gas boiler for domestic application.

2. Background Information

This exchanger is particularly intended to equip a gas boiler for domestic applications, in order to supply a central heating circuit and/or to provide water for sanitary use.

The subject heat exchanger of the invention, more precisely, is a double exchanger constituted by a primary exchanger directly exposed to hot gases generated by the gas burner, and by a secondary exchanger which is exposed to the gases, of considerably lower temperature, which escape from the primary exchanger.

The water, or any other fluid to be heated, circulates in this double exchanger, counter-current to the fumes, that is, by passing first through the secondary exchanger, where it undergoes preheating, then into the primary exchanger where it undergoes heating, properly speaking.

By way of indication, the burnt gases coming directly out of the burner are at a temperature of the order of 1000° C.

After passing through the primary exchanger, their temperature is generally between 100 and 180° C.

These hot gases contain a certain quantity of water as vapour which may condense when it comes into contact with the wall of the secondary exchanger, while it is below the dew point, of the order of 60° C.

This condensation provides supplementary calories to the water circulating in the secondary exchanger, these calories corresponding to the latent heat of evaporation.

A double exchanger of this type, which is described for example in the document EP 0 078 207, enables the yield of the apparatus to be substantially improved.

In the document WO 94/16272 a heat exchanger element is described which consists of a tube of thermally well conducting material in which a coolant fluid, for example water to be heated, is intended to circulate.

This tube is wound in a helix and has a flattened and oval cross section with the major axis substantially perpendicular to the axis of the helix, and each turn of the tube has flat faces which are separated from the faces of the adjacent turn by an interstice of constant height, this height being substantially smaller than the thickness of the said cross section, the spacing between two adjacent turns being furthermore sized by means of cross members which are constituted by bosses formed in the wall of the tube.

This document also describes heat exchangers having several elements such as the above, which are formed in different ways in the various described embodiments.

An exchanger element, so designed, ensures a very large heat exchange between the hot gases passing close to the tubular element and the fluid to be heated which circulates within it.

In fact, during its passage through the interstice between the turns, the flow of hot gases is in contact with a relatively extended surface of the wall of the exchanger element.

The present invention more particularly has as its subject to propose a condensation heat exchanger of the general type mentioned above, the heat exchange elements of which are bundles of flat tubes such as those known from WO 94/16272, which may be consulted if need be.

The prior art closest to the subject of the present invention corresponds to the embodiment illustrated in FIG. 22 of the above document.

The apparatus in question is composed of two parallel bundles of tubes, a primary one referenced 1 and a secondary one referenced 1'.

These two bundles are disposed close to one another, with their axes parallel, and are fixedly mounted within an envelope 8 (termed "body" in the document).

The hot gases are provided by an external apparatus 9 and penetrate via a duct 90 and a cuff 80 into the central portion of the principal exchanger 1 (arrows $J_0$). The hot gases pass radially through the latter, from the inside to the outside (arrows $J_1$), then pass through the secondary exchanger, always radially, but this time from the outside to the inside (arrows $J_2$).

Finally, the cooled gases leave this double exchanger by a cuff 81 (arrows $J_3$).

The object of the invention is to improve the apparatus very schematically shown in FIG. 22 of WO 94/16272, to increase the compactness.

In fact, a constraint often encountered by installers of this kind of apparatus is related to the space available to receive it, which is often reduced.

The invention also has as its object to propose a relatively light apparatus, so as to make the operations of transport, positioning, and fixing in place by the installer more convenient.

The invention springs from the inventor's observation that the energy to be recovered in the secondary exchanger is always smaller than that which is captured by the primary exchanger.

Starting from this observation, it can be deduced that the heat exchange surface of the secondary exchanger, which is proportional to the length of the tube bundle, may be reduced with respect to that of the primary exchanger.

In this way, if the axial dimension of the secondary bundle is reduced, an available space is formed at one of its ends, and may be made use of to install there the evacuation cuff of the burnt, cooled gases.

The bulk of this cuff in the axial direction is therefore not added to that of the apparatus proper, in contrast to the known embodiment of FIG. 22 of WO 94/16272; it fits within that of the apparatus.

Furthermore, the tube length of the secondary exchanger being reduced, the apparatus is of course lighter than an apparatus with primary and secondary coils of the same length, as in the cited apparatus.

Finally, always with the aim of improving compactness, use is made, according to the invention, of a cylindrical burner which is mounted within the primary bundle.

In this way, the axial dimension of the burner is also inscribed within the axial dimension of the envelope.

The subject of the invention is consequently a condensation heat exchanger associated with a gas or fuel oil burner which is composed of two parallel tube bundles disposed adjacent to one another and fixedly mounted within an envelope impermeable to the gases, these two bundles communicating one to another via a "transfer" collector, means being provided for circulating a fluid to be heated, in particular cold water, firstly within tube(s) constituting the secondary bundle, then—via the said transfer collector—within the tube(s) constituting the said primary bundle, the said envelope surrounding the two tube bundles, while being closely spaced apart, this envelope having an exhaust sleeve for the combusted gases which is positioned in the neighbourhood of the said secondary bundle, this exchanger being constructed so that the hot gases generated by the burner pass radially, or approximately radially, passing through the interstices separating the turns, firstly the said primary bundle, then the secondary bundle, and are then evacuated out of the exchanger through the said sleeve.

SUMMARY OF THE INVENTION

According to the invention:

the burner is a cylindrical burner, whose diameter is substantially less than that of the primary bundle, which is mounted coaxially of the interior of the latter, extending axially over all, or practically all, of its length;

the axial dimension of the secondary bundle is substantially less than that of the primary bundle, so that an available space is formed with respect to an end portion of the primary bundle, in the prolongation of the secondary bundle of shorter length, this available space is occupied by an enclosure which communicates with the interior space of the secondary bundle;

the cuff is connected to the wall of the enclosure so as to communicate with it, and is oriented transversely with respect to the axis of the secondary bundle, so that its bulk in the axial direction fits within that of the enclosure.

Furthermore, according to a certain number of possible additional characteristics of the invention:

the tubes constituting each bundle each have rectilinear end portions; the axes of these end portions being located in a common plane which is tangent to the helix formed by the bundle, their openings being turned towards the exterior of the exchanger, from each side of the latter, and the end portions of the primary bundle are located close to the secondary bundle, and reciprocally, while the said end portions have cylindrical openings passing fixedly and sealingly through the wall of the envelope and penetrating, on one side of the latter, into a walled "inlet-outlet" collector capable of being connected to a duct for supplying fluid to be heated and to a discharge duct for the heated fluid, and on its other side, to the transfer collector;

the envelope comprises, on the one hand, a thin-walled tube length of constant cross section, the contour of this tube length, approximately oval, being composed of two end portions of semicircular shape connected by lateral rectilinear sections, and on the other hand, a pair of closure plates, or "facades", the contours of which correspond to that of the said section, and which extend perpendicularly of the axis of the said section of tube, and each of them blocking one of the two openings, each semicylindrical portion of the tube length coaxially and partially surrounding (over a half-turn) one of the said bundles;

one of these facades, termed "forward facade", has an opening for receiving a door supporting the burner, while permitting demounting;

this door also supports, from the outer side, a fan, or a simple cuff, enabling the burner to be supplied with a combustible gas mixture;

facing the internal space of the primary bundle, each of the two facades is furnished with a thermally insulating disc;

the two bundles have the same diameter;

the two bundles have horizontal and parallel axes;

the two bundles are placed one above the other, their axes being located in the same vertical plane;

the secondary bundle is placed above the primary bundle, means such as an inclined trough intercalated between the two bundles being provided to prevent the condensates which may form on the secondary bundle falling onto the primary bundle and/or onto the burner;

the two bundles are placed one beside the other, their axes being located in the same horizontal plane;

the axis of the said discharge sleeve is comprised in the plane containing the axes of the two bundles;

the axis of the said discharge sleeve is perpendicular to the plane containing the axes of the two bundles;

the wall of the said enclosure is a cylindrical tubular sleeve, coaxial with the secondary bundle, one of the end edges of which is fixed against the envelope of the exchanger, while its other end edge is furnished with an annular flange against which the secondary bundle is supported, the said discharge cuff, also of cylindrical shape, being connected to the said sleeve, perpendicular to its axis;

the envelope has an inclined bottom provided with an outlet opening, adapted to collecting and evacuating the condensates which may form on the secondary bundle.

BRIEF DESCRIPTION OF THE DRAWINGS

Other characteristics and advantages of the invention will become apparent from the description and the accompanying drawings, which represent possible embodiments, simply as non-limiting examples.

FIGS. 5-8 are views analogous to FIGS. 1-4 respectively, showing a second possible embodiment of an exchanger according to the invention;

finally.

DETAILED DESCRIPTION

The apparatus shown in FIGS. 1-4 comprises a thin-walled hollow body, or envelope, referenced 1, for example of stainless steel sheet.

Figure 2:
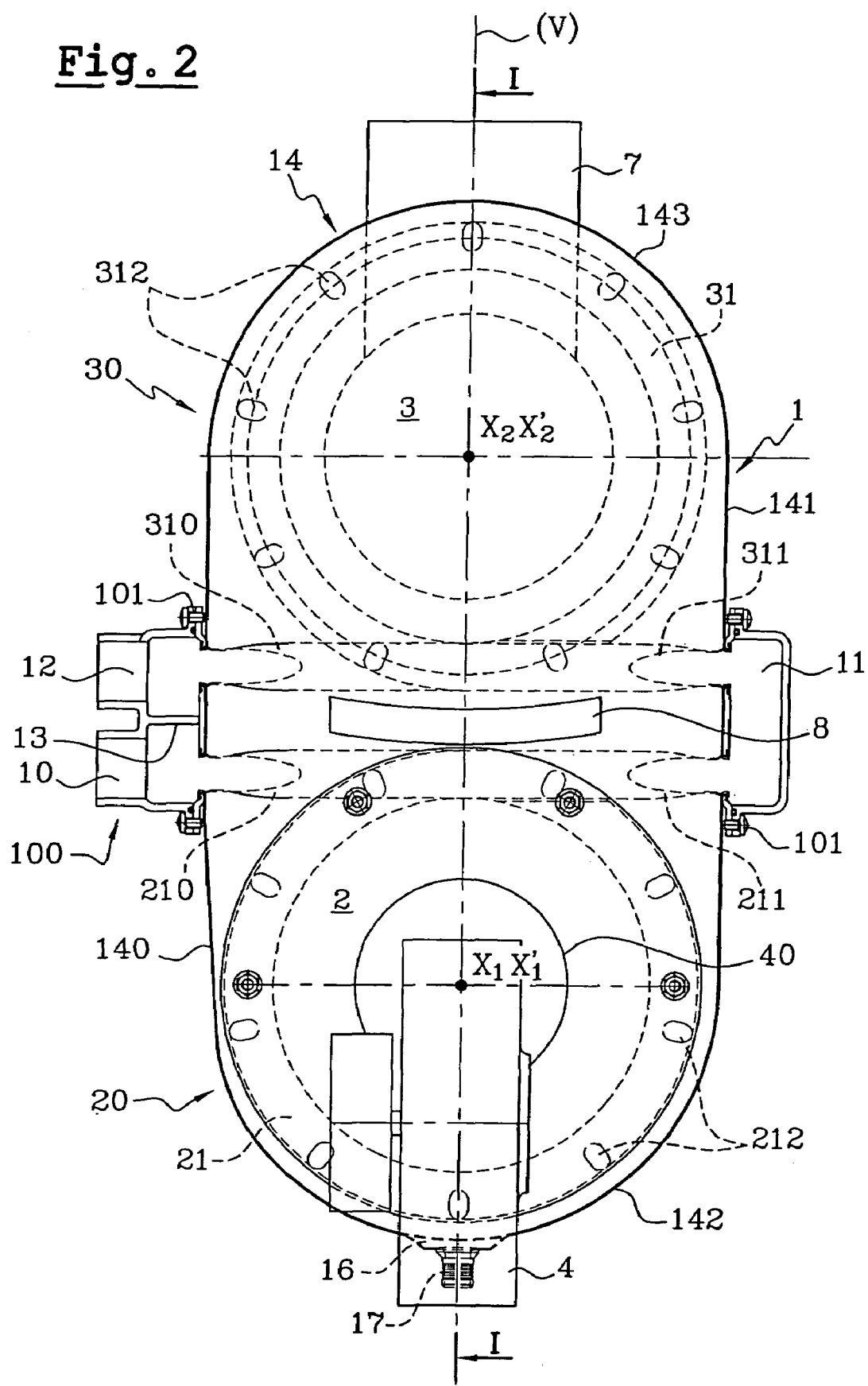
FIG. 2 is a schematic view from the left of the apparatus of FIG. 1.

As may be seen in FIG. 2, seen from the side, the body 1 has an oval shape, the contour of which is formed by high and low semicircular portions, which are connected by two lateral rectilinear segments.

Figure 1:
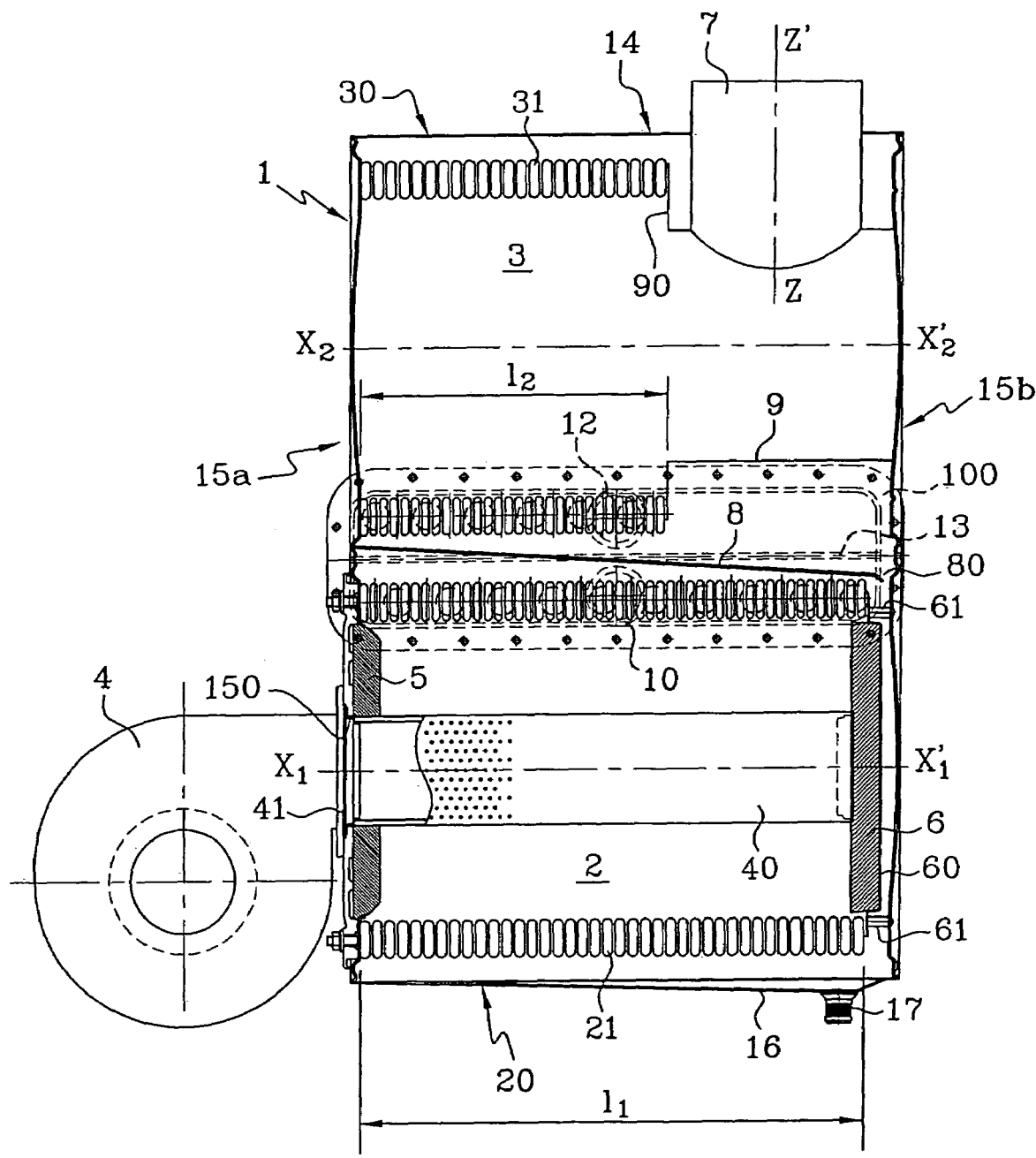
FIG. 1 is a schematic front view of a first embodiment of the invention, cut through the vertical plane referenced I-I in FIG. 2.

The envelope is constituted by a length of tube 14 having the said oval shape, the low and high semicircular portions being denoted by the references 142, 143 in FIG. 2, while the planar lateral portions have been referenced 140 and 141, this length of the tube being closed at each end by covers or "facades" of the same contour, referenced 15a and 15b in FIG. 1.

In the remainder of the present description, "front facade" denotes the facade 15a on the left of FIG. 1, and by "rear facade" the opposite facade 15b.

The two facades 15a and 15b are fixed, gas-tightly sealed, to the central tubular portion 14 by any appropriate known means, for example by welding.

As may be seen in FIG. 1, the bottom 16 of the envelope is inclined in the direction of an exit opening 17, the function of which will be explained later.

Within this envelope 1 are mounted two bundles of flattened tubes, of the kind described in the cited international application, each of these bundles constituting the heat exchange element of a primary exchanger 20 and a secondary exchanger 30.

The primary bundle is referenced 21, while the secondary bundle is referenced 31.

Each of these two bundles is constituted by a set of juxtaposed, coaxial tubular elements with a horizontal axis $X_1X'_1$ for the primary exchanger 20 and $X_2X'_2$ for the secondary exchanger 30.

These two horizontal axes are in the same vertical plane denoted V in FIG. 2, the secondary bundle 31 being vertically above the primary bundle 21.

The internal spaces of the bundles 21 and 31 have been denoted respectively 2 and 3.

A gas or fuel oil burner 40 is associated with the primary exchanger 20. It is a tubular cylindrical burner which has over its whole length plural small holes directed radially, permitting the passage of a combustible gas mixture, for example air+butane or air+fuel oil, the outer surface of the tubular wall constituting the combustion surface.

In the examples shown, the combustible gas mixture is introduced into the apparatus by a fan of known type, which also forms part of the apparatus.

Nevertheless, substituting a mixture supply sleeve, by separate means (of known type) for this fan would not depart from the scope of the invention. The fan is therefore offset from the axis $X_1X'_1$ of the principal exchanger.

The burner 40 has a substantially smaller diameter than that of the bundle 21 within which it is coaxially mounted, that is, along the axis $X_1X'_1$.

The front facade 15a has a circular opening 150 centered on this axis $X_1X'_1$, enabling the burner to be introduced and placed in position within the envelope.

A mounting plate 41 is provided at the exit of the fan 4, enabling the assembly to be fixed against the front facade, for example by screws (not shown).

This construction enables easy dismantling of the burner, particularly in order to clean it, for the maintenance and upkeep of the exchanger.

Facing the space 2, each of the facades 15a and 15b is internally lined with an insulating disc 5, respectively 6, for example of a ceramic-based material.

These elements have the function of protecting at this level the walls of the envelope 1 from the strong heat generated by the combustion.

The discs 5, 6 are fixed within the walls 15a and 15b by any appropriate known means.

The disc 5 is of course pierced in its central portion by an opening similar to the opening 150, to permit the burner to pass through.

It will be noted (see FIG. 1) that the disc 6 is not directly applied against the rear wall 15b. On the contrary, it is kept at a distance from this latter by means of spacers 61.

The bundle 31 is composed of a certain number of helicoidal tubular elements, identical to those which compose the bundle 21.

By way of indication, each element is constituted by a tube of flattened, oval cross section wound up into four turns. Coil formation is to an internal diameter of 185 mm, with an external diameter of 235 mm; the thickness of the flattened section of the tube is 7.2 mm, and the interstice separating two turns is 0.8 mm.

Each element therefore has an axial dimension of 32 mm.

In the example shown, the primary bundle 21 is constituted by a juxtaposition of ten elements.

According to an essential characteristic of the invention, the number of elements composing the secondary bundle 31 is smaller. In the examples shown it is six (instead of ten).

The length $l_1$ of the bundle 21 is therefore equal to 320 mm (32×10), while the length $l_2$ of the bundle 31 is only 192 mm (32×6), or a difference of 128 mm.

In the embodiment of FIGS. 1-4, the secondary bundle 31 is applied by one of its ends against the front facade 15a.

Because of the difference in length $l_1$-$l_2$, a free space is therefore formed between the other end of the bundle 31 and the rear facade 15b.

In this space, there is mounted an enclosure constituted by a cylindrical sleeve 9, centered on the axis $X_2X'_2$, which is fixed by one of its end edges to the rear facade 15b, for example by welding. Its other end has an annular planar flange 90, which extends perpendicularly of the axis $X_2X'_2$.

This flange acts as a support at the other end of the secondary bundle 31. The apparatus comprises a cuff 7 for discharge of burnt, cooled gases.

A cylindrical tubular sleeve is also concerned, has a vertical axis ZZ', and is connected to the sleeve 9, to which it is fixed and with the interior of which it communicates.

The cuff 7 is intended to be connected to a discharge duct for burnt gases and fumes, for example to a chimney duct (not shown).

In the embodiments shown, the elements constituting each of the primary bundle 21 and the secondary bundle 31 are connected in parallel.

However, providing a mounting in series of some or all of the elements for each bundle would not depart from the scope of the present invention.

The end portions of each element are shaped and oriented as shown in FIGS. 1 and 24 of the cited international application.

Each end of a coil is a tube portion whose opening portion is cylindrical, the transition of this opening to the rest of the tube, of flattened cross section, occurring progressively (shaped as a "whistle").

The axes of these two ends (directed outwards) are located in the same plane, which is tangent to the helicoidal coil.

This plane is horizontal here.

The end portions 210 and 211 of the elements constituting the primary (lower) bundle are situated towards the top, while on the contrary those 310, 311 of the secondary bundle (upper) 31 are situated towards the bottom.

This head to tail disposition is arranged in such a manner that the inlet openings of one of the bundles are close to the outlet openings of the other bundle, and vice versa.

Each wound tubular element is retained within the envelope by the engagement of one of its cylindrical opening portions in appropriate circular holes formed in the vertical planar lateral walls 140, 141 of the envelope.

Appropriate sealing means are provided in this region.

Additional members (not shown) may advantageously be provided to ensure that each element within the envelope is well maintained and centered.

It will furthermore be noted that each of the flat tubes constituting a coil has, on one of its wider faces, a series of bosses (stamped in its flat wall) acting as spacers, intended to set precisely the dimension of the interstice separating two turns, according to an arrangement explained in the application WO 94/16272.

The bosses corresponding to the bundles 21 and 31 are respectively denoted by references 212 and 312.

The end portions of each of the coils constituting the exchanger open into collectors fixed externally against the wall of the envelope 1, and more precisely against the planar portions 140, 141, so as to completely surround the opening receiving the end portions of the coils.

Against the face 140 there is fixed a collector termed "inlet and outlet", referenced 100, while against the opposite face 141 there is fixed a collector 11 termed "transfer".

In both cases, these are elongate housings, of general rectangular parallelepiped shape, and having the necessary openings. They are fixed to the envelope 1, for example by screws referenced 101 in FIG. 2, or directly by welding. Sealing is of course provided in this region.

The collector 100 is internally subdivided by a horizontal wall 13.

The portion of the collector 100 located above the wall 13 has a connection pipe 12 intended to be connected to a supply duct for cold water to be heated; moreover, this portion is connected to the assembly of inlet ends of the secondary bundle 31.

Conversely, the lower portion of the collector 100, which corresponds to the space located below the wall 13, has a pipe 10 for connection to a hot water outlet duct; this portion is connected to the assembly of outlet ends of elements constituting the primary bundle 21.

The opposite collector 11 does not have a wall. It ensures the connection between the outlet ends of the secondary bundle 31 and the inlet ends of the primary bundle 21.

Within the envelope there is mounted between the two exchangers a trough 8 which is fixed to the front facade 15a. It is a plate, slightly curved with the concavity facing upwards, and inclined downwards and towards the rear (see FIG. 1).

As may be seen in FIG. 8, this trough occupies only the central zone of the envelope, but does not oppose the passage of burnt gases at the sides, as will be seen later.

The free rear end of the plate 8 is curved downwards with a more inclined lip 80 which overhangs the space, mentioned above, separating the insulating disc 6 from the rear wall 15b (see FIG. 1).

To enable the apparatus to be mounted, the portion 14 of the envelope 1 is composed of two half shells which may be assembled together, for example by welding, along a joint plane corresponding to the vertical plane V.

This enables fitting the two half shells on the two bundles, previously suitably positioned to one another.

Before final assembly, the insulating annular disc 5 and the trough 8 are fixed to the internal face of the front facade 15a. The insulating disc 6 as well as the sleeve 9 with its cuff 7 (to which it is secured beforehand) are fixed to the internal face of the other facade 15b.

In the upper portion, the two half shells constituting the portion 14 of the envelope have a semicircular opening which comes to surround this cuff 7 when they are brought together, the facade 15b having already been suitably positioned. Then, after the facade 15a has been put in place, welding of the assembly is performed, including around the circumference of the cuff 7 at the level of the envelope 14, to effect sealing in this region.

Finally, the burner is of course equipped with an appropriate igniting device, for example an electrode, located close to the combustion surface. A known device is concerned, which has not been shown in the drawings to avoid burdening them unnecessarily.

Figure 3:
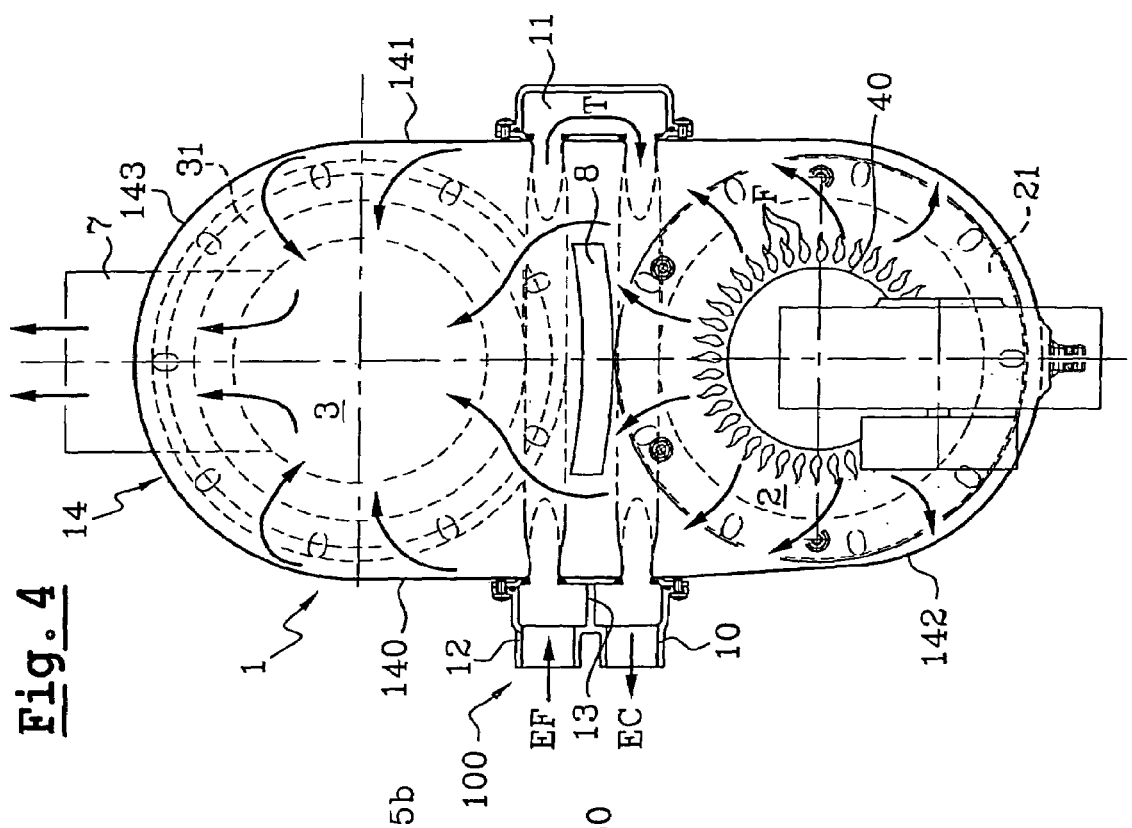
FIGS. 3 and 4 are simplified views, and on a smaller scale, of FIGS. 1 and 2 respectively, these views being intended to illustrate the operation, and in particular the path of the gases.
Figure 4:
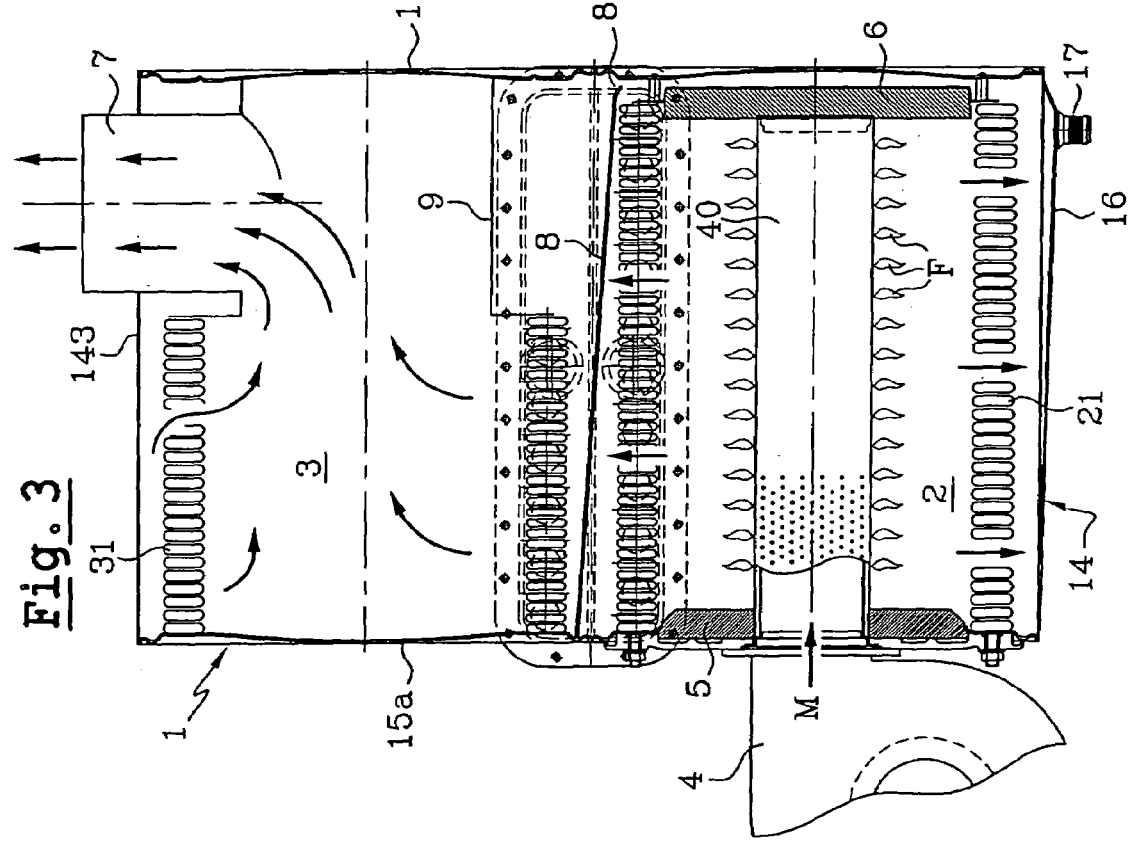

The operation of this apparatus will now be explained with reference to FIGS. 3 and 4.

The fan 4 having been set in motion brings a combustible gas mixture to the interior of the tubular burner 40. This mixture comes out of the wall of the burner through small apertures passing through its wall. When the burner is ignited, combustion occurs and generates flames F over the whole surface of the burner.

At the same time, the water to be heated is circulated. The cold water, EF in FIG. 4, reaches the apparatus by the pipe 12, spreads into the upper portion of the collector 100, and penetrates into the assembly of inlet ends of the upper bundle 31. It leaves the latter by the outlet ends, to enter the collector 11, where it transits, indicated by the arrow T, to then spread into the inlet ends of the lower bundle 21 and circulate within it. Finally, the heated water leaves by the assembly of outlet ends of this bundle, arrives in the lower portion of the collector 100, and leaves this by the pipe 10, as indicated by the arrow EC.

The burning gases generated in the space 2 by the flames F are caused to flow towards the outside of the primary bundle 21. They pass radially through the interstices separating the flat tubes composing it, effecting high heat exchange and so strongly heating the water running through the interior and heated beforehand (as will be seen later) during its passage through the secondary exchanger 31.

On leaving the primary bundle, the burnt gases are considerably cooled due to this heat exchange. They are nevertheless at a temperature clearly higher than that of the water (at ambient temperature) which enters the apparatus.

By way of indication, their temperature is of the order of 100 to 150° C.

These hot gases are channelled upwards, following the internal wall of the envelope. They pass over the sides of the trough 8, and pass through the secondary bundle 31, this time from outside to inside, passing through the turns of flattened tube. During this passage, an at least partial condensation occurs of the water vapour present in the burnt gases, because the walls of the secondary bundle—through which cold or simply lukewarm water passes—are at a temperature lower than the dew point of the combustion products. Besides the normal transfer of calories due to the temperature difference between the burnt gases and the water circulating in the secondary bundle, there is observed a supplementary transfer of calories resulting from the transmission of the latent heat of evaporation connected with the phenomenon of condensation, an exothermic phase change.

A preheating of the water circulating in the secondary bundle is obtained in this way before it reaches the primary bundle.

The burnt gases, markedly cooled, are located in the space 3 within the secondary exchanger, then escape via the enclosure 9 into the discharge duct 7.

The liquid condensates that run out of the tubes of the secondary bundle 31 fall by gravity into the trough 8 so that they do not interfere with the operation of the burner. Given the slope of the trough, they are directed to its rear end, follow the downward curved lip 80, and fall behind the insulating plate 6 into the inclined bottom 16 of the envelope following this inclined bottom, they reach the condensate discharge opening 17, which is connected to an appropriate discharge duct (not shown).

Figure 5:
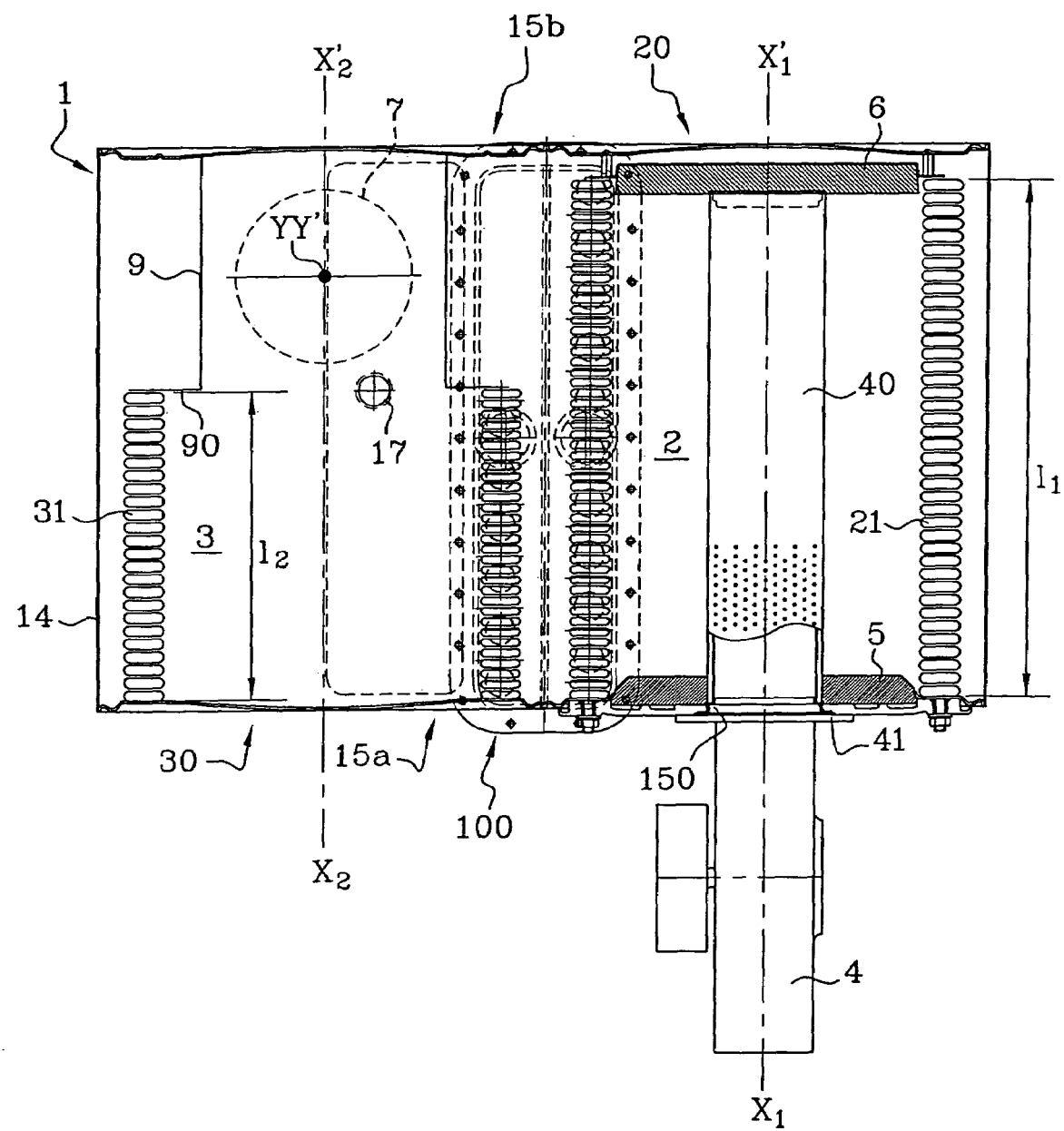
Figure 6:
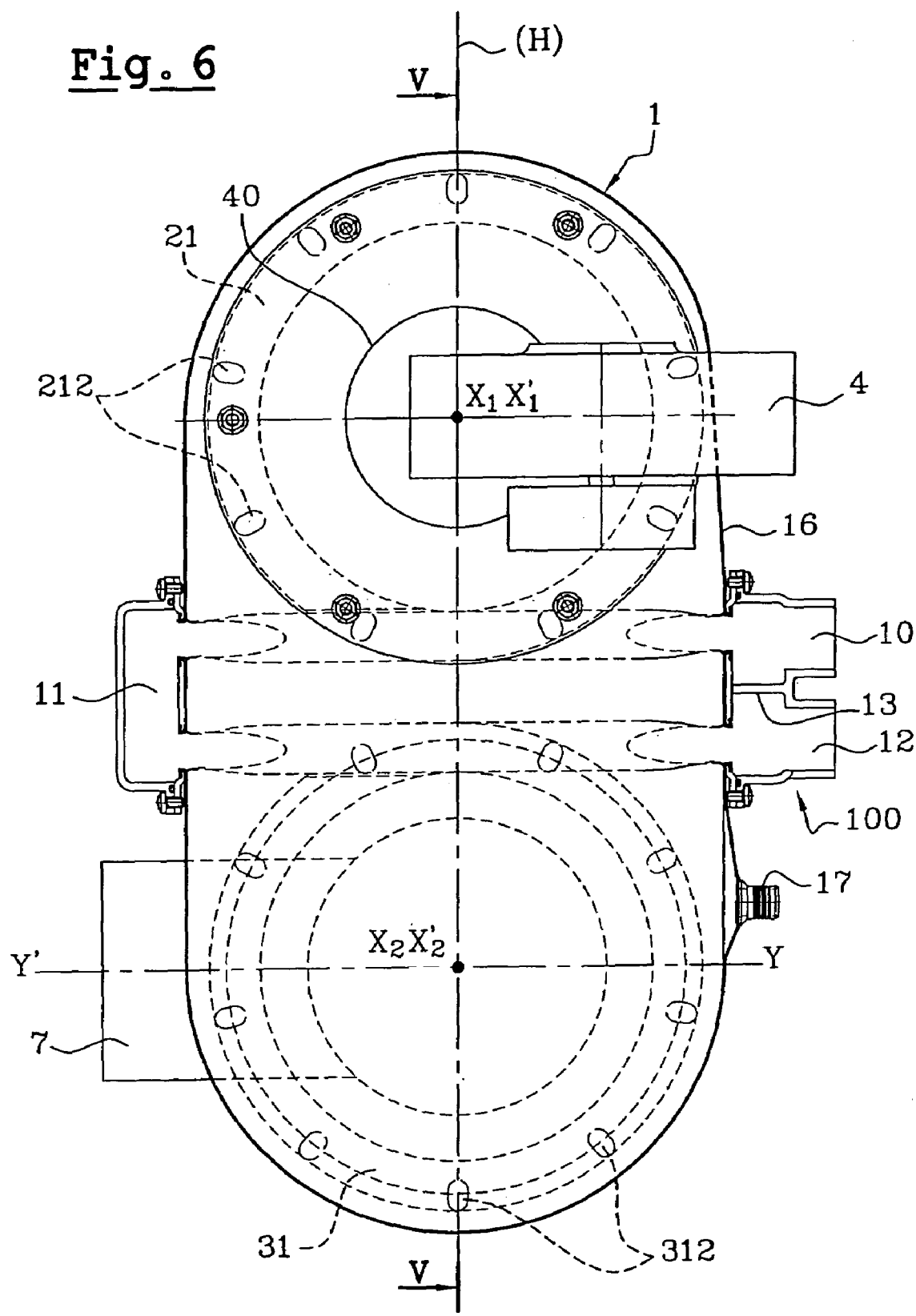

The second embodiment, which is shown in FIGS. 5-7, is completely analogous to that just described. For this reason the same references have been used to denote similar or identical elements.

The same organisation is found as in the first embodiment, with the following two exceptions:

Firstly, the apparatus has a generally horizontal, and not vertical, disposition. In fact, the two bundles are placed side by side this time, and not one above the other, and their axes $X_1X'_1$ and $X_2X'_2$ are in the same horizontal plane H.

In the example shown, the transfer collector 11 is located above, while the inlet-outlet collector 100 is turned downwards (see FIG. 6).

A reverse position is of course possible.

The discharge cuff for burnt gases remains directed upwards.

Secondly, the (vertical) axis YY' of this cuff 7 is perpendicular to the plane containing the axes of the two bundles (and no longer contained in this plane).

In this embodiment, it is not useful to use a collection trough for condensates, since the secondary bundle on which they form is offset laterally and is no longer located directly below the primary bundle and the burner. The bottom of the envelope 16 is inclined, and the condensates fall directly on the bottom, to escape via the discharge connection 17.

FIGS. 7 and 8 show the circulation of gases in the apparatus. It is similar to that of the first embodiment, except that the flow of burnt gases leaving the primary bundle to reach the secondary bundle is displaced about horizontally, and no longer vertically, within the envelope.

In each of the two embodiments which have been described, the tubular elements constituting the two bundles are identical. This is not obligatory; the coils can differ, particularly in their diameter.

Furthermore, the free space receiving the piece 9 and the cuff 7 is situated between the secondary bundle and the rear facade.

Figure 10:
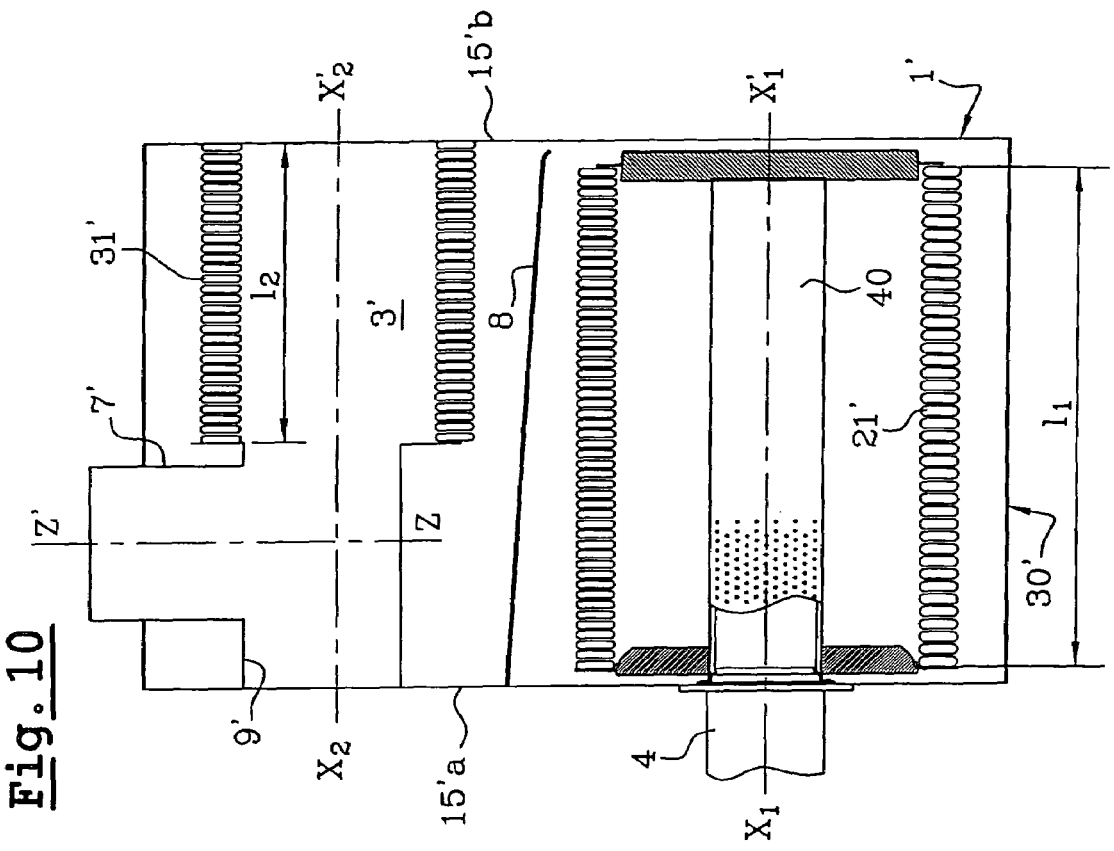
FIGS. 9 and 10 are diagrams representing an alternative of the apparatus, respectively seen from the side and from the face in section.
Figure 9:
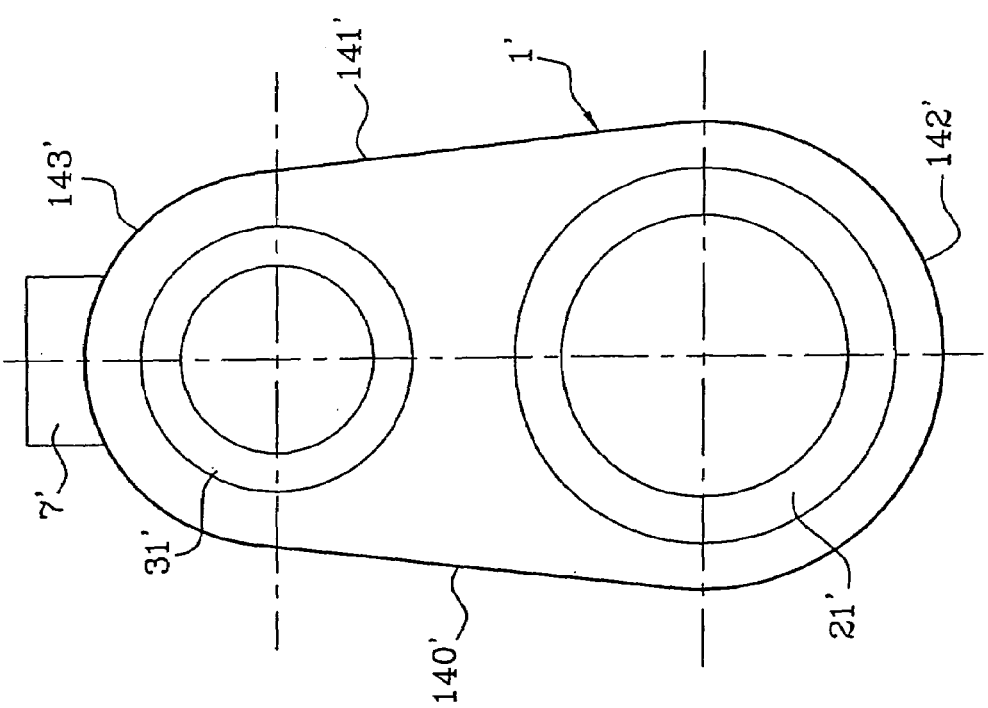

This arrangement is not obligatory, as is shown in the alternative of FIGS. 9 and 10.

In this Figure, the same references are used as in the preceding embodiments for similar but not identical elements, while adding a prime index.

In this way, on these Figures, it will be seen that the diameter of the primary bundle 21' is greater than that of the secondary bundle 31'.

The shape of the envelope surrounding the two bundles is modified here. The lateral faces 140' and 141' are no longer parallel, but are inclined so as to converge slightly upwards.

The enclosure 9' and the cuff 7' are this time interposed between the front facade 15'A and the secondary bundle 31'.

It would of course not depart from the scope of the invention to provide a mixed arrangement of one or other of the first two embodiments with the alternative of FIGS. 9 and 10, consisting of:
  either installing in the apparatus of the first or second embodiment, primary and secondary bundles of different diameters (without displacing the enclosure and the cuff),
  or displacing the cuff into an arrangement similar to that of FIG. 10, (while keeping the diameters identical for the two bundles).

An apparatus according to the invention is very compact and light, while being very efficient as regards yield.

Although remarkably well adapted to domestic use for heating water, it can find application in other fields, particularly in industry for heating various liquids.

The invention claimed is:

1. Condensation heat exchanger, associated with a gas or fuel oil burner (40), which is composed of two parallel tube bundles, one (21) termed "primary" and the other (31) termed "secondary", each of these two bundles consisting of a tube, or a group of tubes disposed end to end, forming a helical coil, in which the wall of the tube(s) being made of a good thermal conductor and having a flattened and oval cross section with the major axis perpendicular, or approximately perpendicular, to that of the helix, while the width of the interstice separating two adjacent turns of the helical coil is constant and markedly smaller than the thickness of the said cross section, these two bundles being disposed close together and fixedly mounted within an envelope (1) which is impermeable to the gases, and communicating one with another via a collector (11) termed "transfer", means being provided to cause circulation of a fluid to be heated, in particular liquid water, firstly within tube(s) constituting the said secondary bundle (31), then—via the said transfer collector (11)—to the interior of the tube(s) constituting the said primary bundle (21), the said envelope (1) surrounding the two tube bundles while being closely spaced from each of them, this envelope (1) having a discharge cuff (7) for burnt gases, positioned in the neighbourhood of the said secondary bundle (31), this exchanger being formed so that the hot gases generated by the burner (40) pass radially, or approximately radially, passing through the interstices separating their turns, firstly through the primary bundle (21) and then the said secondary bundle (31), and are then discharged from the exchanger through the said cuff (7), characterised in that: the said burner (40) is a cylindrical burner whose diameter is substantially less than that of the primary bundle (21), and which is mounted coaxially within the latter, extending axially over all, or practically all, of its length; the axial dimension ($l_2$) of the said secondary bundle (31) is substantially smaller than that ($l_1$) of the said primary bundle (21), so that an available space is formed facing an end portion of the primary bundle, in the prolongation of the shorter secondary bundle; this available space is occupied by an enclosure (9) which communicates with the internal space (3) of the secondary bundle; the said cuff (7) is connected to the wall of the said enclosure (9) so as to communicate with it, and is oriented transversely with respect to the axis ($X_2X'_2$) of the secondary bundle (31), so that its bulk in the axial direction fits into that of the enclosure (9).

2. Exchanger according to claim 1, characterised in that the tubes constituting each bundle (21, 31) each have rectilinear end portions (210-211, 310-311) the axes of these two end portions being located in a common plane which is tangent to the helix formed by the bundle, the openings being turned towards the outside of the exchanger from each side of the latter; that the end portions of the primary bundle are situated close to the secondary bundle, and vice versa, the said end portions having cylindrical openings passing fixedly and sealingly through the wall of the envelope (1) and penetrating, on one side of the latter, into a walled collector (100) termed "inlet-outlet", capable of being connected to a supply duct for fluid to be heated and to a discharge duct for heated fluid, and on its other side, into the said transfer collector (11).

3. Exchanger according to claim 1 or 2, characterised in that the said envelope (1) comprises on the one hand a thin-walled tube length (14), of constant cross section, the approximately oval contour of this cross section being composed of two end portions of semicircular form connected by lateral rectilinear segments, and on the other hand a pair of closure plates, or "facades" (15a, 15b), the contours of which correspond to that of the said cross section and which extend perpendicularly of the axis of the said tube length, and each blocking one of the two openings, each semicylindrical portion (142, 143) of the said tube length (14) coaxially and partially surrounding (over a half-turn) one of the said bundles (21, 31).

4. Exchanger according to claim 3, characterised in that one (15a) of the said facades, denoted as "front facade", has an opening (150) capable of receiving a door (41) supporting the said burner (40) while enabling it to be demounted.

5. Exchanger according to claim 4, characterised in that the said door (41) also supports, on its outer side, a fan (4), or a simple cuff, enabling supplying the burner with a combustible gas mixture.

6. Exchanger according to claim 3, characterised in that each of the two facades (15*a*, 15*b*) is furnished with a thermally insulating disc (5, 6) facing the internal space (2) of the said primary bundle (21).

7. Exchanger according to claim 1, characterised in that the two bundles have the same diameter.

8. Exchanger according to claim 1, characterised in that the two bundles (21, 31) have their axes ($X_1X'_1$, $X_2X'_2$) horizontal and parallel.

9. Exchanger according to claim 8, characterised in that the two bundles (21, 31) are placed one above the other, their axes ($X_1X'_1$, $X_2X'_2$) being located in the same vertical plane (V).

10. Exchanger according to claim 9, characterised in that the secondary bundle (31) is placed above the primary bundle (21), means such as an inclined trough (8) intercalated between the two bundles being provided for preventing condensates which may form on the secondary bundle (31) do not fall onto the primary bundle (21) or the burner (40).

11. Exchanger according to claim 8, characterised in that the two bundles (21, 31) are placed one beside the other, their axes ($X_1X'_1$, $X_2X'_2$) being situated in the same horizontal plane (H).

12. Exchanger according to claim 1, characterized in that the axis (ZZ') of the said discharge cuff (7) is comprised in the plane containing the axes ($X_1X'_1$, $X_2X'_2$) of the two bundles.

13. Exchanger according to claim 1, characterised in that the axis (YY') of the said discharge cuff (7) is perpendicular to the plane containing the axes ($X_1X'_1$, $X_2X'_2$) of the two bundles.

14. Exchanger according to claim 1, characterised in that the wall of the said enclosure (9) is a cylindrical tube length coaxial with the secondary bundle (31), of which one of the end edges is fixed against the envelope (15*b*) of the exchanger, while its other end edge is furnished with an annular flange (90) against which the secondary bundle (31) is supported, the said discharge cuff (7), also of cylindrical shape, connecting to the said tube length (9), perpendicularly to its axis ($X_2X'_2$).

15. Exchanger according to claim 1, characterised in that its envelope (1) has an inclined bottom (16) provided with an outlet connection (17), suitable for collecting and discharging condensates which may form on the secondary bundle (31).

* * * * *